United States Patent [19]

Yamamoto et al.

[11] Patent Number: 4,824,220
[45] Date of Patent: Apr. 25, 1989

[54] DEVICE FOR FORMING AN IMAGE WITH A LASER BEAM

[75] Inventors: Takemi Yamamoto; Kuniyasu Makino; Makoto Suzuki, all of Nagoya, Japan

[73] Assignee: Brother Kogyo Kabushiki Kaisha, Aichi, Japan

[21] Appl. No.: 104,830

[22] Filed: Oct. 2, 1987

[30] Foreign Application Priority Data

Oct. 2, 1986 [JP] Japan .................................. 61-235212
Dec. 16, 1986 [JP] Japan .................................. 61-299752

[51] Int. Cl.⁴ ........................... G02F 1/01; G02F 1/11; H01S 3/10
[52] U.S. Cl. ...................................... 350/354; 372/22; 350/358
[58] Field of Search ........................... 358/75; 346/108; 372/21, 22; 350/354, 358

[56] References Cited

U.S. PATENT DOCUMENTS

| 4,250,465 | 2/1981 | Leib ................................ 372/99 X |
| 4,467,172 | 8/1984 | Ehrenwald et al. ...... 219/121 L J X |
| 4,482,902 | 11/1984 | Bailey et al. ........................ 346/108 |
| 4,610,536 | 9/1986 | Smyth et al. ........................... 358/75 |

Primary Examiner—Eugene R. LaRoche
Assistant Examiner—Nathan W. McCutcheon
Attorney, Agent, or Firm—Kane, Dalsimer, Sullivan, Kurucz, Levy, Eisele and Richard

[57] ABSTRACT

A device for forming an image with a laser beam is disclosed. The device comprises a laser, means for on-off modulating a laser beam, means for converting a wavelength of the laser beam generated by the laser and means for scanning the laser beam. With means for converting a wavelength of the laser beam, the laser which generates a laser beam, the wavelength of which does not directly meet the requirements, may be adopted to form an image.

8 Claims, 4 Drawing Sheets

DEVICE FOR FORMING AN IMAGE WITH A LASER BEAM

BACKGROUND OF THE INVENTION

This invention relates to a device for forming an image with a laser beam.

A laser beam has recently been developing its applicable fields especially as an image data transferring medium in a laser beam printer and so on.

On the other hands, a special photosensitive paper which is sensitive and exposed if a light having its wavelength falling in some range has been proposed in Japanese Patent Provisional Publication Nos. SHO58-23025, SHO58-88739 and so on. Further it has also been proposed to adopt this photosensitive paper as a recording sheet for a page printer by, for instance, generating optical ON-OFF signals with a laser beam and scanning the above optical signals via an optical scanning mirror on the above paper.

However, the wavelength of the light to which the above special paper is sensitive is usually between 300 nm and 600 nm. In this connection, such popular lasers as YAG (Yttrium-Aluminum-Garnet) Laser, Semi-conductor Laser and He-Ne (Helium-Neon) Gas Laser whose wavelengthes are 1060 nm, 750 nm and 630 nm, respectively, can not be adopted. It is true that there are such type of lasers which can generate the laser beam having its wavelength falling in the above range or which can alternate the wavelength of their generating laser beams, but some are expensive relative to the above mentioned popular lasers and some require additional belongings which make the contruction large-sized and complex. Especially, if the semi-conductor lasers can be utilized, the laser beam printer can be constructed simply and compactly with reasonable costs.

Similarly, it has been studied to construct a color image displaying system with three lasers, the wavelengthes of the laser beams generated by which correspond to the three primary colors, i.e., red, blue and green colors, respectively. If a colored image can be formed by utilizing the laser beams, the desirable level of the resolution of the color image can be obtained since there is no limitation therefor such as caused by a number of pictures existing in a CRT (Cathode Ray Tube) display system and/or a displaying system with liquid crystal shutters.

However, some lasers which generate the laser beams corresponding to one of the three primary colors are expensive and some of the three primary colors are difficult to be directly obtained by the lasers.

SUMMARY OF THE INVENTION

It is therefore an object of the invention to provide a device for forming an image with a laser beam capable of adopting a laser of relatively compact and low price despite of the wavelength of the laser beam generated by the above laser being out of the required range.

Another object of the invention is to provide a device for forming a color image with lasers wherein three primary-colored beams are obtained from the lasers to form an color image by composing the three beams.

For the above purpose, in accordance with the invention, there is provided a device for forming an image with a laser beam comprising a laser, means for on-off modulating said laser beam, means for converting a wavelength of the laser beam generated by said laser and means for scanning said laser beam.

In other aspect of the invention, there is provided a device for forming a color image on a screen comprising: three lasers for generating three laser beams having different wavelengthes respectively; at least one wavelength conversion device for converting the wavelength of at least one of said three laser beams into the wavelength of one of three primary-colored beams; and means for two-dimentionally scanning said three laser beams on said screen.

With the above devices, as the wavelength of a laser beam generated by a laser is converted to a suitable one, the laser which does not directly generate a laser beam having the required wavelength can be adopted for forming an image.

DESCRIPTION OF THE ACCOMPANYING DRAWINGS

DESCRIPTION OF THE PREFERRED EMBODIMENTS

Figure 1:
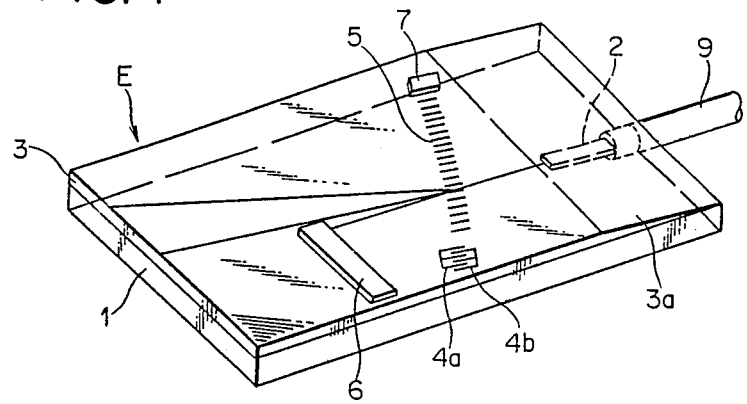
FIG. 1 is a perspective view of a light modulating and deflecting device of the invention.
Figure 2:
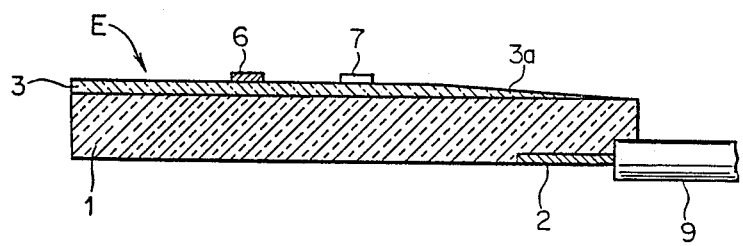
FIG. 2 is a side sectional view of the device illustrated in FIG. 1.
Figure 3:
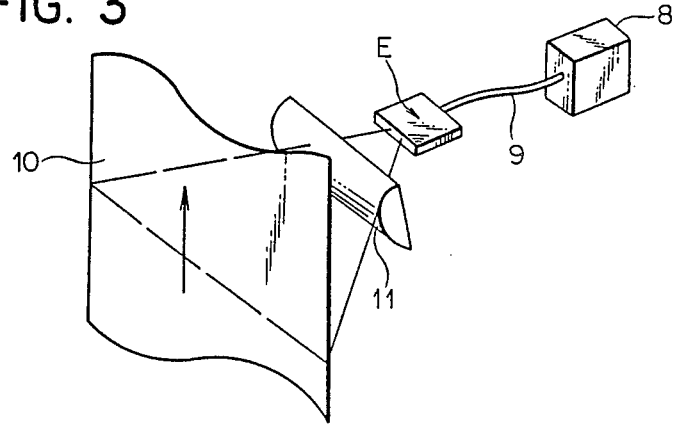
FIG. 3 is a diagramatic constructional view of a laser beam printer embodying the invention.

FIG. 1 shows a light modulating and deflecting device E adopted in a laser beam printer as shown in FIG. 3, which comprises a photo-permeable crystal 1 composed of Lithium Niobate ($LiNbO_3$). A harmonics generating wave guide 2 is formed at the lower end of one side of said crystal 1 which has 2000 nm width, 550 nm height and 6 mm length. A light modulating and deflecting wave guide 3 is formed at the whole area of the upper surface of the crystal 1. The harmonics generating wave guide 2 is formed by exchanging lithium ions in Lithium Niobate with hydrogen ions. The light modulating and deflecting wave guide 3 is formed by diffusing Titanium on the upper surface layer of the crystal 1.

If a light is entered into the harmonics modulating and deflecing wave guide 2 from one side thereof, a secondary harmonics is generated by Non-linear effect caused by the Lithium Niobate crystal. This secondary harmonics is a light wave, a wavelength of which is reduced or shortened to half of the wavelength of the light before entered into the guide 2.

The light is then radiated at a certain angle from the guide 2 toward the light modulating and deflecting wave guide 3 inside the crystal 1. As the inclined portion 3a is formed at the entrance side of the peripheral surface of the guide 3, the light entered into the guide 3 is not leaked out of but accurately advanced inside the guide 3. At the peripheral surface of the guide 3, a pair of comb-shaped electrodes 4a and 4b are arranged beside the path of the light. If the high-frequency voltage of more than 60MHz is applied between the pair of comb-shaped electrodes 4a and 4b, a surface acoustic wave 5 is generated in the direction crossing the path of the light. This means that a kind of a diffraction grating is formed on the path of the light and the light is deflected there at a certain diffraction angle on a certain plane. As the frequency of the high-frequency voltage applied between the pair of comb-shaped electrodes 4a and 4b can be varied steplessly, the diffraction angle of the light can be suitably changed by varying the frequency of the high-frequency voltage.

A light absorber 6 is adhered on the upper surface of the guide 3 at the position where the light passing without deflection reaches. Accordingly, when the voltage is not applied between the pair of comb-shaped electrodes 4a and 4b, the light advancing in the guide 3 is absorbed by the light absorber 6 and does not exit from the guide 3. The surface acoustic wave 5 generated by the pair of comb-shaped electrodes 4a and 4b is absorbed by a wave absorber 7 adhered on the surface of the guide 3 so as to prevent the buffer of waves inside the guide 3.

FIG. 3 shows a laser beam printer wherein the above described light modulating and deflecting device E is adopted.

A laser beam generated by a YAG laser 8 is introduced into the harmonics generating wave guide 2 through an optical fiber 9. At the exit side of the device E, a photo-sensitive recording paper 10 is arranged to be transferred in the direction indicated by the arrow in FIG. 3. A cylindrical lens 11 is arranged between the device E and the recording paper 10. The laser beam generated by the YAG laser 8 has an original wavelength of 1060 nm is transformed in the guide 2 of the device E and the light having a wavelength of 530 nm which is the half of the original wavelength thereof is generated and introduced into the guide 3 of the device E. Between the pair of the comb-shaped electrodes 4a and 4b of the device E, a high-frequency voltage is applied while steplessly varying the frequency thereof and is ON-OFF controlled based upon the printing information transmitted from a computer, not shown. When switched to the ON state, the harmonic light advancing in the guide 3 of the device E is deflected by the surface acoustic wave 5 generated by the electrodes 4a and 4b so as to exit from the guide 3 toward the recording paper 10. On the contrary, when switched to the OFF state, as the light advancing inside the guide 3 is not deflected, it advances linearly and is absorbed by the light absorber 6 of the device E. Accordingly, it does not exit from the guide 3 and the corresponding portion on the recording paper 10 is not exposed. Thus, the laser beam generated by the YAG laser 8 is on-off modulated and the surface of the recording paper 10 is scanned by the light carrying the ON-OFF signals thereon.

Although in the aforementioned embodiment, the ON-OFF modulation of the laser beam as well as the deflection thereof is carried out by utilizing Acoustooptic effect caused by the surface acoustic wave 5 generated by the pair of comb-shaped electrodes 4a and 4b, on-off modulation and deflection of the laser beam can be carried out separately, for instance, by deflecting the laser beam by utilizing Thermooptical effect while on-off modulating the laser beam by utilizing Acoustooptical effect.

Further, the crystal 1 can be, instead of Lithium Niobate, composed of other materials showing Non-linear optical effect and/or Acoustooptical effect.

Moreover, the laser may be selected in accordance with the sensitive wavelength of the recording paper. For instance, the semi-conductor laser generates the laser beam having the original wavelength of 750 nm and therefore the converted beam thereof has the wavelength of 375 nm. Accordingly, if the recording paper being sensitive to the light having the wavelength of around 375 nm, the semi-conductor laser shall be adopted. In case of the semi-conductor laser, it can be adhered to the entrance of the guide 2, although not illustrated in the drawings.

Figure 4:
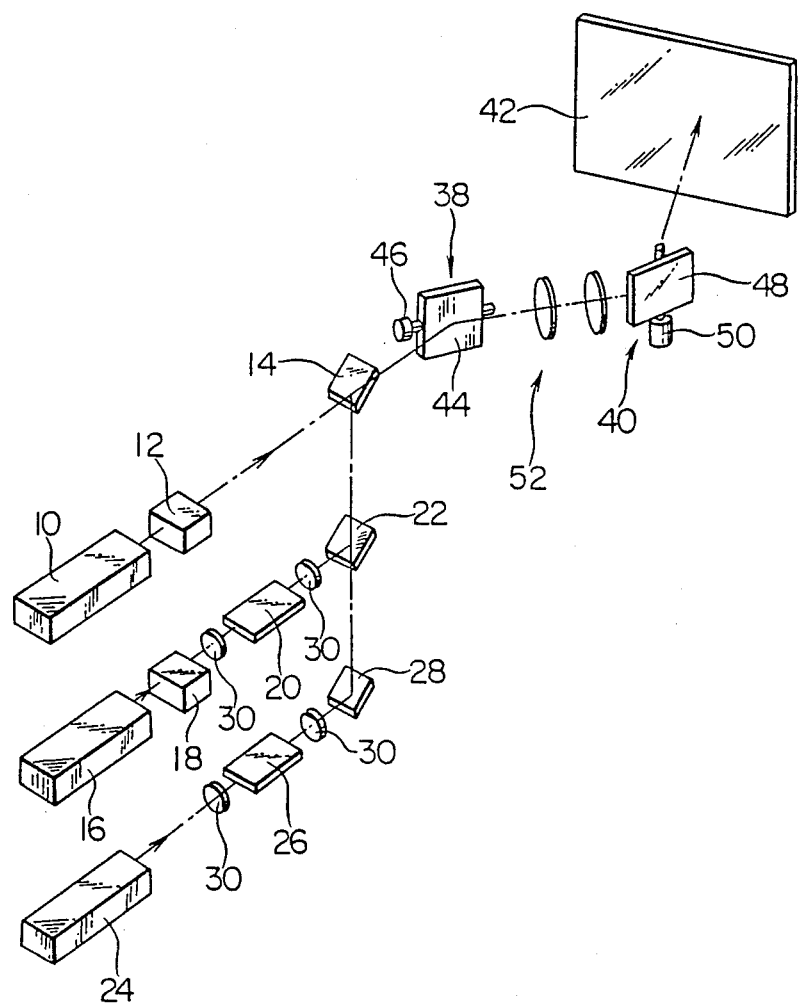
FIG. 4 is a diagramatic constructional view of a color image displaying system embodying the invention.

FIG. 4 illustrates a fundamental construction of a color image displaying system embodying the invention.

In FIG. 4, a first laser 10 is a He-Ne Gas laser which generates a red-colored laser beam having the wavelength of 630 nm. This red-colored laser beam is transmitted to a first half mirror 14 via a modulator 12. The second laser 16 is a YAG laser which generates a laser beam having the wavelength of 1060 nm. This laser beam is transmitted to a second half mirror 22 via a modulator 18 and a SHG (secondary harmonics generator) device 20. The third laser 24 is a semi-conductor laser which generates a laser beam having a wavelength of 860 nm, which is transmitted to a mirror 28. The SHG devices 20 and 26 are respectively positioned between a pair of lens 30 which are disposed to prevent the expansion of the beam.

Each of the modulators 12 and 18 is for on-off modulating a laser beam output from the laser 10 or 16, and comprises an optical shutter showing Acoustooptic effect or Electrooptic effect or an optical shutter utilizing a liquid crystal. As the third laser 24 comprises the semi-conductor which can on-off switch the output beam, it is unnecessary to arrange a modulator for on-off modulating the output beam thereof.

Figure 5:
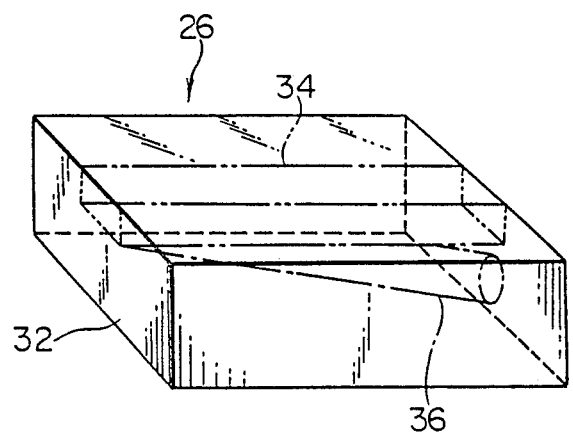
FIG. 5 is a perspective view of a secondary harmonics generating device adopted in the color image desplaying system illustrated in FIG. 4.
Figure 6:
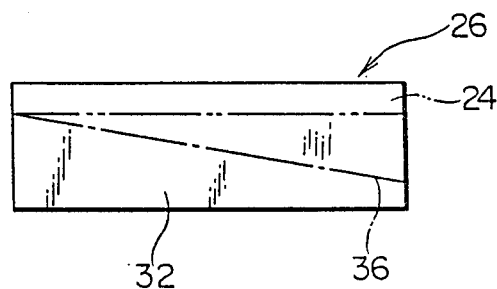
FIG. 6 is a side view of the secondary harmonics generating device illustrated in FIG. 5.

The SHG device 20 or 26 is a second harmonics generating device constructed as illustrated in FIGS. 5 and 6, and functions as a wavelength converting device. This SHG device 20 or 26 comprises, a base plate 32 composed of a monocrystal of Lithium Niobate (LiNbO$_3$) or BNNO (Ba$_2$NaNb$_5$O$_{15}$), and an optical wave guide 34 which is formed by proton-exchange with Benzoic acid or Phosphoric acid and shows higher refractive index than the other part. If the YAG laser beam having the wavelength of 1060 nm is entered into the optical wave guide 34, the beam (second harmonics) 36 having the wavelength of half of the original one is output from the guide 34 with a certain angle relative to the guide 34. Accordingly, the output beam of the second laser 16 is converted to the green-colored beam having the wavelength of 530 nm by the SHG device 20. Further, the output beam of the third laser 24 is converted to the blue-colored beam having the wavelength of 430 nm by the SHG device 26.

The beams of three primary colors, i.e., the red-colored beam, the green-colored beam and blue-colored beam prepared as above are composed into one beam by the first half mirror 14. The composed beam is, then deflected both in vertical and horizontal directions by a vertical deflection device 38 and a horizontal deflection device 40 to be two-dimensionally scanned on a screen 42.

The vertical deflection device 38 comprises a mirror 44 secured to a horizontal shaft and an actuator 46 rotating the horizontal shaft for vertically deflecting the reflected beam. The horizontal deflection device 40 comprises a mirror 48 secured to a vertical shaft and an actuator 50 rotating the vertical shaft for horizontally deflecting the reflected beam. Between the vertical deflection device 38 and the horizontal deflection device 40, the lens system 52 is arranged for suitably converging the laser beam.

Figure 7:
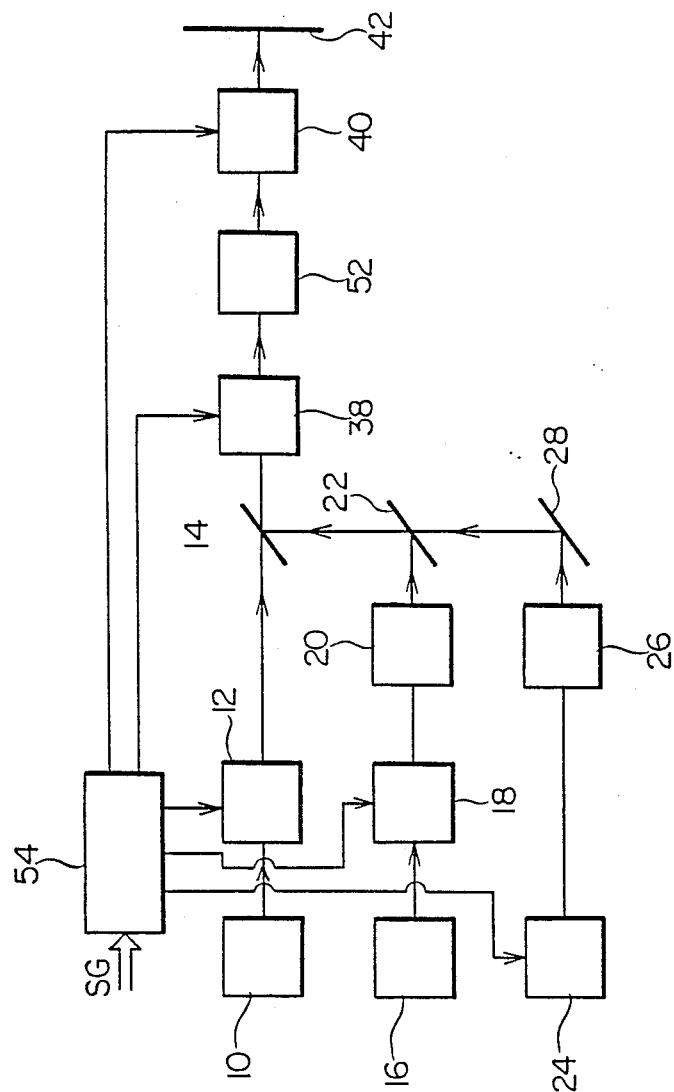
FIG. 7 is a block diagram of the secondary harmonics generating device illustrated in FIG. 5.

As illustrated in FIG. 7, a controller 54 is provided to on-off switch the modulators 12, 18 and the third laser 24 as well as changes the deflection angle of the vertical deflection device 38 and the horizontal deflection device 40 via the actuaters 46, 50. In other words, the controller 54 periodically changes the deflection angles of the deflection devices 38 and 40 for two-dimensionally scanning the laser beam on the screen 42, and switching the modulators 12 and 18 and the third laser 24 based upon the image informations transmitted from a not-shown device for preparing color image signals SG to form a color image on the screen 42.

With the above displaying system, since there is no limit in improvement of resolution which exists in the CRT display system and/or the liquid crystal shutter system, the resolution of which depends upon a number of picture elements, high level resolution of the color image can be obtained. Further, as it becomes unnecessary to arrange in the system a Brown tube or a liquid-crystal plate wherein the liquid crystal is enveloped, the construction of the system becomes simple and compact.

Although in the foregoing embodiment the SHG devices 20 and 26 are adopted for converting output beams of the second and third lasers 16 and 24 into primary-colored beams, if the second laser 16 can generates a green-colored laser beam the SHG device 20 can of course be eliminated, and if the first laser 10 can generate an infrared beam another SHG device which converts the infrared beam to the red-colored beam must be arranged. Further, instead of the SHG device 20 or 26, a wavelength converter which parametrically amplifies the wavelength of the beam by utilizing Non-linear effect can be adopted. With this wavelength converter, the wavelength of the output beam can be varied by varying a resonance frequency by oscillation caused by a parametric amplifing function in a nonlinear-type crystal BNNO mounted on a resonater surrounded by a pair of mirrors. Accordingly, it can be possible to elongate the wavelength of the beam and therefore the laser which generates a laser beam having shorter wavelength than the primary-colored beams can be adopted.

Further, in the above embodiment illustrated in FIG. 4, a deflection beam splitter or a dichroic mirror can be adopted instead of the first and second half mirrors 14 and 22 and the mirror 28. Moreover, as the screen 42, a white or gray colored sheet or a semi-transparent sheet for viewing from the opposite side of the screen may be utilized. The vertical deflection device 38 and the horizontal deflection device 40 may comprise a polygonal mirror, a holographic scanner or a solid-state deflecting device.

As above described, in accordance with the present invention, the lasers, the wavelengthes of which do not directly meet the requirements, become able to be utilized for forming an image.

We claim:

1. A device for modulating and deflecting a light beam comprising a light-transmittable crystal, a first optical wave guide formed on a first surface of said crystal for receiving entering light waves and generating a harmonic of half the wavelength of the entered light and radiating the same at an angle with respect to the path of the entering light waves, a second optical wave guide formed on a surface of said crystal opposite said first surface for receiving the light radiated from said first optical wave guide, and means positioned beside the path of said radiated light for on-off modulating the light passing into said second optical wave guide and deflecting the same onto a predetermined plane.

2. The device according to claim 1 wherein said light-transmittable crystal is composed of Lithium Niobate, said first optical wave guide is formed by exchanging lithium ions in Lithium Niobate with hydrogen ions, and said second optical wave guide is formed by diffusing Titanium in a surface layer of said crystal.

3. The device according to claim 2 wherein the upper peripheral surface of the entrance side of said second optical wave guide is inclined to prevent the leakage of the entered light.

4. The device according to claim 2 wherein said on-off modulating and deflecting means comprises a pair of comb-shaped electrodes generating a surface acoustic wave in a direction crossing a light advancing path if a high-frequency voltage is applied between said electrodes.

5. The device according to claim 4 wherein the deflection angle of the light deflected by said on-off modulating and deflecting means is varied by varying the frequency of said high-frequency voltage applied between said electrodes.

6. The device according to claim 4 wherein said on-off modulating and deflecting means further comprises a light absorber arranged on a light path, along which the not-deflected light advances, for absorbing said not-deflected light.

7. The device according to claim 4 wherein said on-off modulating and deflecting means further comprises a wave absorber arranged at the opposed side of said electrodes for absorbing said surface acoustic wave.

8. A laser beam printer including a device for modulating and deflecting a light beam comprising a light-transmittable crystal, a first optical wave guide formed on a first surface of said crystal for receiving entering light waves and generating a harmonic of half the wavelength of the entered light and radiating the same at an angle with respect to the path of the entering light waves, a second optical wave guide formed on a surface of said crystal opposite said first surface for receiving the light radiated from said first optical wave guide, and means positioned beside the path of said radiated light for on-off modulating the light passing into said second optical wave guide and deflecting the same onto a predetermined plane.

* * * * *